(12) United States Patent
Wang et al.

(10) Patent No.: US 7,639,181 B2
(45) Date of Patent: Dec. 29, 2009

(54) METHOD AND DEVICE FOR TRACKING WEAK GLOBAL NAVIGATION SATELLITE SYSTEM (GNSS) SIGNALS

(75) Inventors: Chun Wang, San Mateo, CA (US); Shaowei Han, Palo Alto, CA (US)

(73) Assignee: SiRF Technology Holdings, Inc., San Jose, CA (US)

( * ) Notice: Subject to any disclaimer, the term of this patent is extended or adjusted under 35 U.S.C. 154(b) by 293 days.

(21) Appl. No.: 11/618,131

(22) Filed: Dec. 29, 2006

(65) Prior Publication Data

US 2007/0205940 A1   Sep. 6, 2007

Related U.S. Application Data

(63) Continuation-in-part of application No. 11/173,894, filed on Jul. 1, 2005.

(51) Int. Cl.
 *H01S 1/00* (2006.01)
(52) U.S. Cl. .................................. 342/357.12
(58) Field of Classification Search ................................
 342/357.01–357.17
 See application file for complete search history.

(56) References Cited

U.S. PATENT DOCUMENTS

| 5,271,034 | A | 12/1993 | Abaunza |
| 5,884,214 | A | 3/1999 | Krasner |
| 6,114,992 | A | 9/2000 | Underbrink |
| 6,184,824 | B1 | 2/2001 | Bode et al. |
| 6,298,083 | B1 | 10/2001 | Westcott et al. |
| 6,392,590 | B1 | 5/2002 | Kagemoto |
| 6,407,699 | B1 * | 6/2002 | Yang ...................... 342/357.12 |
| 6,459,405 | B1 | 10/2002 | Da et al. |
| 6,611,756 | B1 | 8/2003 | Chen et al. |
| 6,772,065 | B2 | 8/2004 | Sanmiya et al. |
| 2002/0025011 | A1 | 2/2002 | Sullivan |
| 2003/0147457 | A1 * | 8/2003 | King et al. ................... 375/148 |
| 2003/0187576 | A1 | 10/2003 | Sanmiya et al. |
| 2005/0050293 | A1 | 3/2005 | Falk et al. |
| 2006/0071851 | A1 | 4/2006 | Graas et al. |
| 2007/0046534 | A1 * | 3/2007 | Ziedan et al. ........... 342/357.12 |
| 2008/0174483 | A1 * | 7/2008 | Bryant et al. .......... 342/357.06 |

* cited by examiner

*Primary Examiner*—Thomas H Tarcza
*Assistant Examiner*—Nga X Nguyen
(74) *Attorney, Agent, or Firm*—Pillsbury Winthrop Shaw Pittman LLP

(57) ABSTRACT

A Global Navigation Satellite System (GNSS) receiver and associated method capable of tracking weak GNSS signals from a plurality of GNSS satellites. In a preferred embodiment, code and carrier tracking loops are initially closed around the code phase, carrier frequency, and data bit edge estimates handed over from an acquisition mode. In subsequent tracking, early, prompt, and late copies of the code replica are correlated with the incoming signal. The prompt correlations are coherently integrated over an extended updating interval for data bit edge and sign estimation as well as for carrier phase and frequency error discrimination whereas the early and late correlations are used for code error discrimination. Code delay and carrier phase and frequency errors are used to update the code and carrier tracking loop filters. Together with data bits, they form observables of a GNSS signal's time and frequency parameters for timing and position fixing.

30 Claims, 10 Drawing Sheets

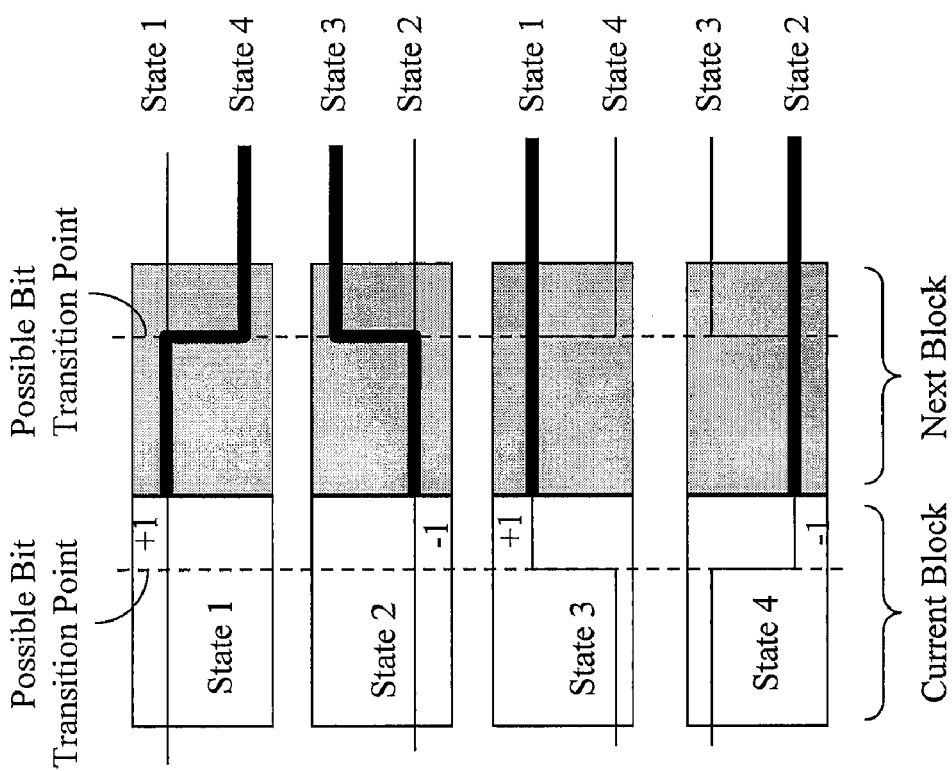

METHOD AND DEVICE FOR TRACKING WEAK GLOBAL NAVIGATION SATELLITE SYSTEM (GNSS) SIGNALS

RELATED APPLICATIONS

This application is a continuation-in-part of U.S. patent application Ser. No. 11/173,894, entitled "Method and Device for Acquiring Global Navigation Satellite System (GNSS) Signals," filed on Jul. 1, 2005.

FIELD OF THE INVENTION

The present invention relates generally to devices and methods for tracking radio signals. In particular, the present invention relates to direct sequence spread spectrum (DS/SS) signals such as those used in the Global Navigation Satellite System (GNSS).

BACKGROUND OF THE INVENTION

The Global Navigation Satellite System (GNSS) will encompass the U.S. Global Positioning System (GPS), the Russian Global Navigation Satellite System (GLONASS) and the future European GALILEO System as well as other regional satellite radio navigation systems and space borne and ground-based augmentation systems. Being fully operational, the GPS has a constellation of twenty four satellites that are in six different orbit plans around the earth. A navigation solution is obtained through measuring propagation delay times of the radio signals broadcast by the orbiting satellites to a GPS receiver. Normally, a receiver must acquire and track signals from at least four satellites in order to solve for the variables of longitude, latitude, altitude, and time that are needed to precisely determine location. The received GPS signals must attain a minimum power level to ensure a GPS solution with acceptable accuracy, which is routinely met when there is a clear line-of-sight (LOS) view from the receiver antenna to GPS satellites above the horizon.

However, when the line-of-sight view between the receiver and a satellite is obstructed (e.g., due to foliage, mountains, buildings, or other structures) the GPS signal strength may be severely attenuated, leading to position fix with poor accuracy and even breakdown of tracking loops inside a regular receiver. It is therefore desired to improve GPS receiver sensitivity to operate on GPS signals of very low power level (also referred to as weak signals) to satisfy the requirements of location-based mobile e-commerce and emergency call location (E911).

More details about GPS operations under normal signal conditions can be found in the books entitled, *Global Positioning System: Theory and Applications* (Vols. I and II), edited by B. W. Parkinson and J. J. Spilker Jr., AIAA, 1996; *Understanding GPS: Principles and Applications* ($2^{nd}$ Ed.), edited by E. D. Kaplan and C. J. Hegarty, Artech House Publishers, 2006; *Fundamentals of Global Positioning System Receivers—A Software Approach* ($2^{nd}$ Ed.), by J. B. Y. Tsui, John Wiley & Sons, Inc., 2005; and *Global Positioning System, Signals, Measurements, and Performance* ($2^{nd}$ Ed.) by P. Misra and P. Enge, Ganga-Jamuna Press, 2006. The present invention sets forth a GPS receiver and associated methods that can operate on weak signals.

To extract the time and frequency parameters of received GPS signals for position fixing, a GPS receiver first detects the presence of such signals (often referred to as the acquisition stage) and then follows the acquired signals subject to changes in time and frequency as the satellites move across the sky (referred to as the tracking stage). During the first stage, normal signal acquisition is accomplished by a search in discrete steps over a grid covering the time and frequency uncertainty zone for a GPS satellite signal. Since the ID number of this satellite is not known either, a search is also conducted among the twenty-four active GPS satellites in orbit. Due to the discrete nature of the acquisition search, it can only provide coarse estimates of signal parameters as the starting point to close a refined "search" loop in the tracking stage.

To enable weak GPS signal acquisition, one known technique at the receiver end is to extend the signal integration time. Coherent integration is more gainful than non-coherent integration. However, when the coherent integration interval extends beyond, e.g., 20 milliseconds, which is the duration of one data bit for GPS C/A-codes, the sign reversal of navigation data bits becomes destructive if it occurs in the middle of a long coherent integration. As a result, an additional signal parameter, namely, the data bit transition (also called data bit edge interchangeable in this specification), has to be searched in addition to the two usual parameters, code phase (time) and carrier frequency, and the ID number of GPS satellites. This in fact constitutes a four dimensional search.

The number of satellites to be searched for is fixed and so is the number of code phases. However, the number of search steps for frequency increases linearly with the coherent integration interval whereas the locations of data bit transition increases exponentially with the coherent integration interval. A brute force approach considering all possible combinations is undesired because it would require excess computation time, storage memory, and power consumption. A practical approach to acquiring weak GPS signals is the assisted GPS (AGPS). The AGPS approach relies upon a wireless data link (or other means) to distribute, in real time, such information as time, frequency, navigation data bits, satellite ephemeredes, and approximate position as well as differential corrections to special GPS receivers equipped with a network modem so as to reduce the uncertainty search space, to help lock onto signals, and to assist navigation solution. This approach, however, comes with a heavy price associated with installing and maintaining the wireless aiding infrastructure and services required to provide the coverage.

In contrast, a standalone high-sensitivity receiver has many practical and economical advantages over assisted GPS receivers. One standalone high-sensitivity receiver and associated method named Block-Accumulating Coherent Integration over Extended Interval (BACIX) has been disclosed in the co-pending patent application entitled "Method and Device for Acquiring Global Navigation Satellite System (GNSS) Signals of Very Low Power Level," Application Ser. No. 11/173,894, filed Jul. 1, 2005, of which the present invention is a continuation-in-part and which is hereby incorporated into this specification by reference. Test results with real GPS data are disclosed in the paper entitled "Block-Accumulating Coherent Integration over Extended Interval (BACOX) for Weak GPS Signal Acquisition," presented by the first co-inventor at the $19^{th}$ International Technical Meeting of the Institute of Navigation Satellite Division in September 2006 in Fort Worth, Tex., which is hereby incorporated into this specification by reference.

It is conceivable to conduct signal tracking using the same techniques as used in acquisition. However, such an approach is not cost-effective. Acquisition is based on discrete search according to a predefined sequence, providing coarse estimates of signal parameters. If used for tracking with fixed grid points in an open loop manner, it becomes inefficient in computation without incorporating any information that has been gathered about the signal during the acquisition and tracking process and, more importantly, its performance is relatively poor simply because of a rather large spacing between search steps.

After being handed over from the acquisition stage, a closed-loop tracking channel maintains lock onto a signal of interest. By taking advantage of the latest estimates of the underlying signal, a tracking loop can follow small variations in the signal while using a narrow bandwidth to average out noise. Once locked, the signal parameters are used to generate GPS observables that in turn are used to obtain a GPS position and time solution. Such a tracking channel is also built in with the ability to handle large instantaneous disruption of signals for graceful degradation of performance via a coasting-reacquisition-tracking process.

The general architecture of a conventional tracking loop remains valid for weak signal tracking. However, its actual implementation must deal with such problems as unknown data bit transitions occurred within a long integration interval that is extended in order to boost the signal power. In addition, the residual frequency error either due to the relative motion between a GPS satellite and the receiver and/or to the receiver's clock drifts becomes critical when the length of coherent integration interval is significant. There are, consequently, outstanding problems with known techniques when applied to weak GPS signal tracking in a standalone high-sensitivity receiver.

A need therefore exists for maintaining tracking of weak GPS signals once handed over from acquisition. This need is met by the present invention as described and claimed below.

SUMMARY

A Global Navigation Satellite System (GNSS) receiver and associated method capable of tracking weak GNSS signals (i.e., of very low power level) from a plurality of GNSS satellites produces GNSS signal code time, carrier frequency, and data bit transition parameters to obtain a timing and position solution. The GNSS receiver includes an antenna and an analog front-end to intercept the incoming radio-frequency signal and to convert it to an appropriate intermediate frequency for digital sampling. The GNSS receiver also includes a baseband signal processor to process the digital samples. The baseband signal processor is organized into functionally identical channels, each dynamically assigned to a different satellite in view of the receiver, with the processing results of the baseband delivered to a data processor for obtaining a navigation solution. By processing the digital samples with special functionalities, the baseband signal processor is able to acquire and track weak signals.

In a preferred embodiment, code and carrier tracking loops are initially closed around estimates of code phase, carrier frequency, and data bit edge handed over from an acquisition mode and then updated constantly on new signals in accordance with embodiments of the present invention. At least three copies of the code replica, named early, prompt, and late, each delayed by a certain code spacing, are correlated with the incoming signal. The prompt correlations are coherently integrated over an extended interval to boost the signal power while averaging out noise. To perform coherent integration over an extended interval in the presence of unknown residual Doppler frequency and data bits, a first technique of successive sign reversal of short-length correlations (e.g., the 1 millisecond correlation for GPS C/A-codes) enables data bit transition detection and data bit sign estimation and correction within a data bit interval (a block). This technique also allows for efficient use of Fourier transform, which only needs to be calculated once with simple manipulation for all other possible bit alignments. In a second technique, the FFT is implemented as a bank of bandpass filters to integrate blocks of correlations in a coherent manner for large residual Doppler frequency. Finally, a third technique optimizes the overall computation efficiency by pruning unlikely branches of the search paths in partial sums, leading to data bit edge and sign estimation as well as carrier phase and frequency error discrimination. Meanwhile, the early and late correlations are used for code error discrimination. Code delay and carrier phase and frequency errors are fed to code and carrier loop filters for maintaining tracking and signal lock. Together with data bits, they form observables of a GNSS signal's time and frequency parameters for timing and position fixing.

The above and other advantages of embodiments of this invention will be apparent from the following more detailed description when taken in conjunction with the accompanying drawings.

BRIEF DESCRIPTION OF THE DRAWINGS

For a better understanding on the present invention, reference is made to the following description of an exemplary embodiment thereof, considered in conjunction with the accompanying drawings, in which:

FIGS. 7a and 7b are graphic representations of data bit transition states for an unaligned block in terms of a time diagram (FIG. 7a) and a truth table (FIG. 7b), respectively, in accordance with an embodiment of the present invention;

DETAILED DESCRIPTION

The present invention provides systems and methods for a GNSS receiver capable of tracking weak satellite signals and extracting time, frequency and other parameters from the signals as an integral part of the receiver's baseband signal processor operations. Although systems and methods of the present invention can be used for the tracking of various signals used in the GNSS, systems and methods of the present invention are particularly well suited for use with the tracking of signals from GPS satellites. Accordingly, although not so limited, an exemplary embodiment of the present invention will be described in an application of tracking weak signals from GPS satellites.

Figure 1:
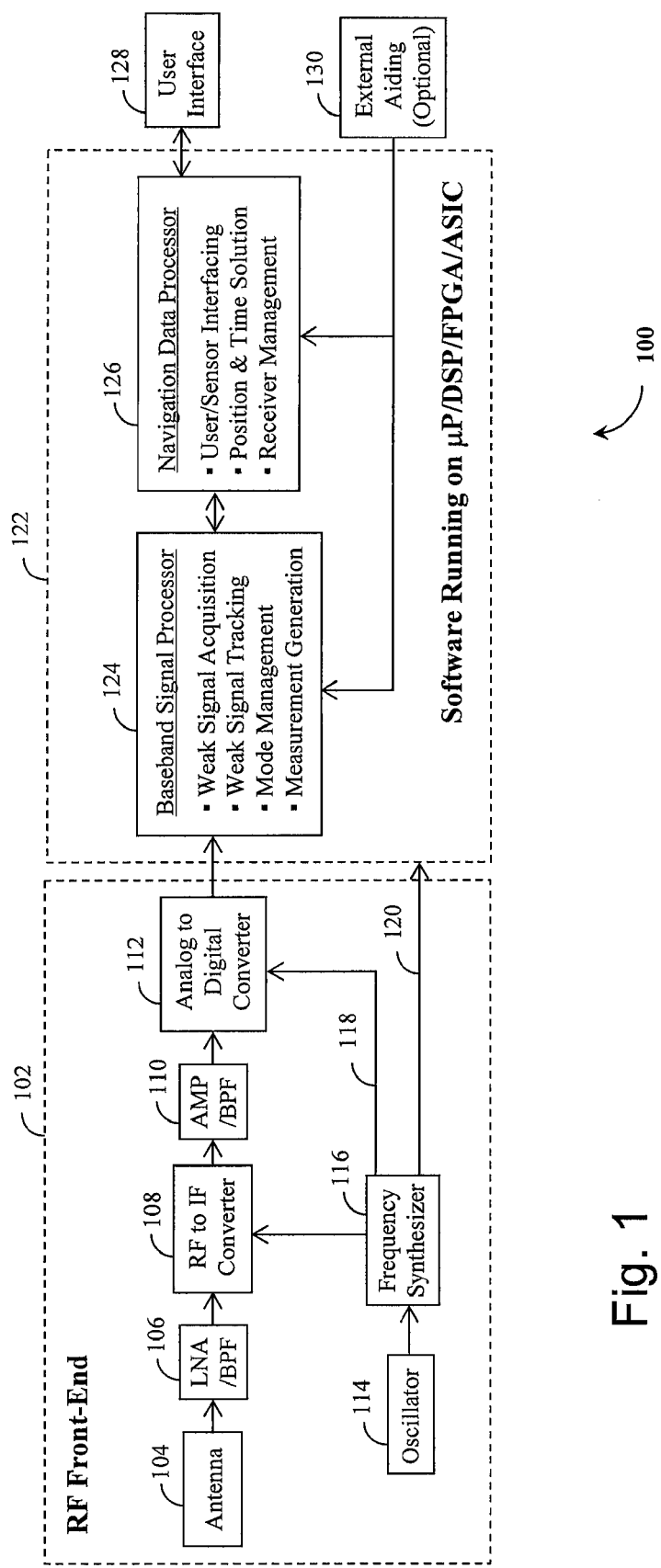
FIG. 1 is a schematic illustrating an exemplary standalone high-sensitivity GPS receiver with weak signal tracking capability as a part of the receiver's baseband signal processor in accordance with an embodiment of the present invention.

Referring to FIG. 1, an exemplary standalone high-sensitivity GPS receiver 100 is shown with its weak signal tracking capability implemented as an integral part of the receiver's baseband signal processor 124 software, which runs on a microprocessor (µP), a digital signal processor (DSP), a field programmable gate array (FPGA) or an application specific integrated circuit (ASIC) 122 in accordance with embodiments of the present invention. More specifically, the receiver 100 comprises a radio-frequency (RF) front-end 102 and a µP/DSP/FPGA/ASIC block 122. An antenna 104 captures GPS signals from a plurality of GPS satellites in view of the receiver and the captured signals pass through a low-noise amplifier (LNA) and a bandpass filter (BPF) 106 and are then coupled to a radio frequency to intermediate frequency (RF to IF) down converter 108. The down-converted signals may pass through several stages of amplification (AMP) and bandpass filtering (BPF) 110 (only one stage is shown in FIG. 1 for simplicity) for possible further mixing before reaching an analog to digital converter (ADC) 112. To drive the RF front-end 102, various frequency components are produced by the frequency synthesizer 116, which is driven in turn by a frequency standard 114 such as a temperature-compensated crystal oscillator (TCXO). The frequency synthesizer 116 also produces a sampling clock 118 to the analog to digital converter 112 that samples and quantizes the IF signal and then passes the samples over for digital processing. The frequency synthesizer 116 may also produce a clock 120 to drive the operations of the µP/DSP/FPGA/ASIC block 122.

Still referring to FIG. 1, as a part of the receiver software running on a µP/DSP/FPGA/ASIC 122, a navigation data processor 126 interacts with a user interface 128 to display the results to and receive commands from a user and/or an auxiliary sensor. External aiding 130 with such information as the initial position and time and ever the navigation data messages, if available, can be used to facilitate the receiver operation. The external aiding may be received, e.g., over a wireless data link, from a remote server. The position and time solutions are produced by the navigation data processor 126 with measurements delivered by the baseband signal processor 124. In addition, the navigation data processor 126 also performs house-keeping and receiver management.

Referring again to FIG. 1, the baseband signal processor 124 also performs weak signal acquisition, processing mode management, and measurement generation among others in addition to weak signal tracking that is the object of the present invention to be described in great detail later in this specification. Weak signal acquisition is a prerequisite for weak signal tracking and an exemplary technique for weak signal acquisition is the Block-Accumulating Coherent Integration over Extended Interval (BACIX) technique disclosed in the co-pending patent application Ser. No. 11/173,894, which has already been incorporated into this specification by reference. The techniques for design and construction of the GPS antenna, RF front-end, navigation data processor, mode/receiver management, measurement generation, and user interface as well as optional external aiding that possess the characteristics relevant to the present invention are well known to those of ordinary skill in the art.

Figure 2:
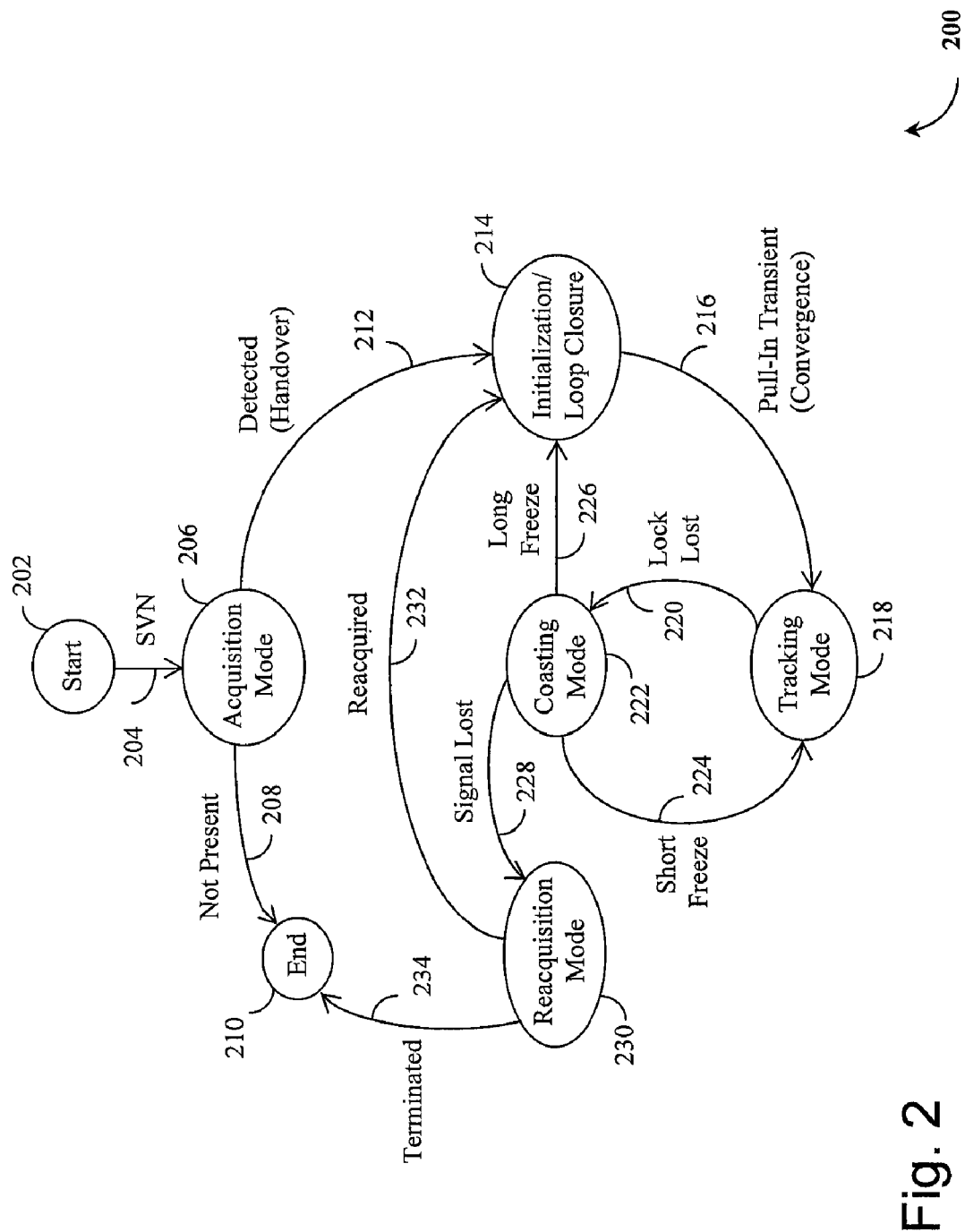
FIG. 2 is a state diagram depicting major operation modes and their transitions for an exemplary standalone high-sensitivity GPS receiver in accordance with an embodiment of the present invention.

Referring to FIG. 2, a state diagram 200 of major operation modes and transitions among these modes is shown for an exemplary standalone high-sensitivity GPS receiver in accordance with an embodiment of the present invention. At the start 202, a particular satellite designated by a space vehicle number (SVN) 204 is assigned for search. The acquisition mode 206 is then entered. Exemplary operations in such an acquisition mode are presented in the co-pending patent application Ser. No. 11/173,894 above mentioned. There are two outcomes from the acquisition mode 206. The designed satellite signal is determined to be "not present" 208 and search for the signal of this satellite is put to an end 210. On the other hand, when the signal is declared "detected" 212, the operation is handed over to the tracking mode 218 via the step of initialization and loop closure 214. That is, the tracking loops are initialized with signal parameters coarsely estimated in the acquisition mode. These parameters may include SVN, code phase, carrier Doppler frequency, millisecond boundary, data bit transition, extended integration interval, and signal to noise ratio (SNR) among others. The tracking loops typically converge after a short pull-in transient 216 after loop closure and the receiver soon enters the steady state and stays in the tracking mode 218 most of time until the satellite drops off the horizon or the user turns it off.

However, brief disruptions may occur when the received signal power level suddenly drops below a tracking threshold. When such a lock lost 220 occurs, a coasting mode 222 is entered in which no updating is allowed. If after a short freeze 224 the signal returns above the tracking threshold, the tracking mode resumes. However, a long freeze 226 may require re-initialization of the tracking loops. If after a long wait, the signal power level remains flat, "signal lost" 228 is declared and the reacquisition mode 230 is entered. In reacquisition, search is conducted over a small area around the previously estimated signal parameters. When the signal is reacquired 232, the initialization and loop closure 214 is entered anew prior to the tracking mode 218. On the other hand, if the signal cannot be detected, the search is terminated 234 and an end 210 is put for this satellite.

Figure 3:
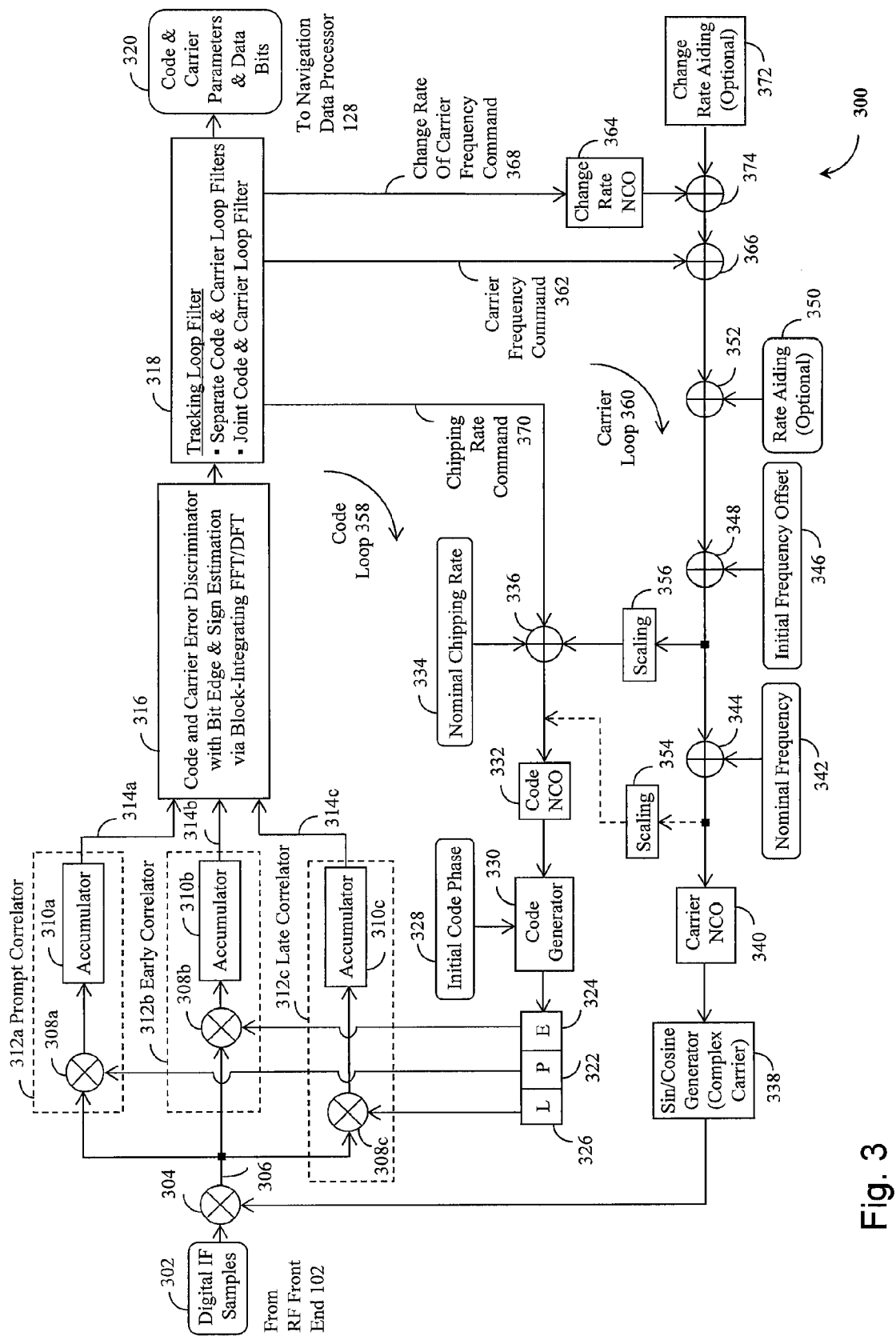
FIG. 3 is a schematic illustrating a general architecture of tracking loops within a weak signal tracking channel in accordance with an embodiment of the present invention.

Referring to FIG. 3, an exemplary architecture of weak signal tracking loops 300 is shown as a part of a baseband signal processor 124 in accordance with an embodiment of the present invention. Digital IF samples 302 from an RF front-end 102 are processed by weak signal tracking loops 300, constituting a weak signal tracking channel. A multiplicity of similar weak signal tracking channels may be configured to operate in parallel, each assigned to a specific GPS satellite. In an alternative embodiment, one weak signal tracking channel can be used to sequentially process signals from multiple GPS satellites, one after another. In yet another embodiment, a number of weak signal tracking channels can be arranged in a sequential-parallel fashion to process signals from various GPS satellites. As an example of illustration, but not limitation, a single weak signal tracking channel is described in detail below.

Within each weak signal tracking channel 300, the digital IF samples 302 first pass through a mixer 304. By multiplying the signal samples 302 with a complex carrier replica 338, the mixer effectively down-converts the IF signal to near the baseband subject to an unknown residual Doppler to be estimated within the carrier loop 360. The mixed signal is then correlated with at least three copies of the code replica named prompt 322, early 324, and late 326, respectively. As shown, the prompt, early, and late short-length complex correlations (e.g., over 1 milliseconds) 314a, 314b, and 314c are generated by the prompt, early, and late correlators 312a, 312b, and 312c, respectively. The correlators consist of multipliers 308a, 308b, and 308c followed by accumulators 310a, 310b, and 310c. These short-length complex correlations are buffered and processed to drive a code and carrier error discriminator 316 with data bit edge and sign estimation via a block-integrating Fourier transform. Either the discrete Fourier transform (DFT) or its fast implementation such as the fast Fourier transform (FFT) can be used to implement the Fourier transform digitally. The code and carrier error discriminator 316 drives in turn a tracking loop filter 318 implemented either as separate code and carrier loop filters or as a joint code and carrier loop filter. The tracking loop filter 318 also delivers code and carrier parameters and data bits 320 to a navigation data processor 128 for GPS position fixing. The details of a code and carrier error discriminator 316 and a tracking loop filter 318 pertinent to the present invention are described in conjunction with FIGS. 4 and 8 later in this specification.

Still referring to FIG. 3, the carrier loop 360 is closed by the carrier frequency command 362 from the tracking loop filter 318. The carrier frequency command 362 is combined with an optional rate aiding 350 in an adder 352. The combined frequency is adjusted by an initial frequency offset 346 (i.e., handed over from the acquisition mode) via another adder 348. The adjusted frequency offset is then combined with the nominal frequency 342 via an adder 344. This yields the total frequency to drive the carrier numerical controlled oscillator (NCO) 340. The carrier NCO 340 drives a sin/cosine generator 338, thus producing the complex carrier replica for carrier down-conversion.

At the same time, the code loop 358 is closed by the chipping rate command 370 from the tracking loop filter 318. The chipping rate command 370 is combined with the nominal chipping rate 334 in an adder 336, which also accepts the rate aiding from the carrier loop via scaling 356. As shown in FIG. 3, the rate aiding from the carrier loop can also be done in the total frequency level via a different scaling 354. The total chipping rate then drives the code NCO 332, which drives in turn a code generator 330. The code generator is set at an initial code phase 328 during handover from the acquisition mode and produces several copies of the code replicas such as prompt, early, and late sequences 322, 324, and 326, with a desired spacing for code despreading and short-length correlation.

Referring again to FIG. 3, it is important to realize that for a carrier loop, its error discriminators only provide estimates of code and carrier errors averaged over an integration interval. When this interval is long, even though the estimates are very close to the true averages, the actual errors at the beginning and the end of the extended interval may differ quite significantly, leading to undesired degradation in correlation. To account for such variations in frequency over an extended integration interval, a unique feature is configured in FIG. 3 with a change rate NCO 364. In contrast to frequency command in conventional receivers, which is constant over a update interval, the frequency command 362 of the present invention is adjusted several times within the long update interval by a term proportional to the rate of change in frequency. An exemplary implementation of this frequency adjustment over the extended interval is illustrated in FIG. 3 wherein a change rate of carrier frequency command 368 is issued by the tracking loop filter 318 to a change rate NCO 364, which is used to adjust the frequency command 362 via an adder 366. In addition, an optional change rate aiding 372 can be included via an adder 374 if available. An exemplary aiding is temperature-based estimation of a receiver clock's drift so as to remove its contribution from the total change rate in frequency.

Figure 4:
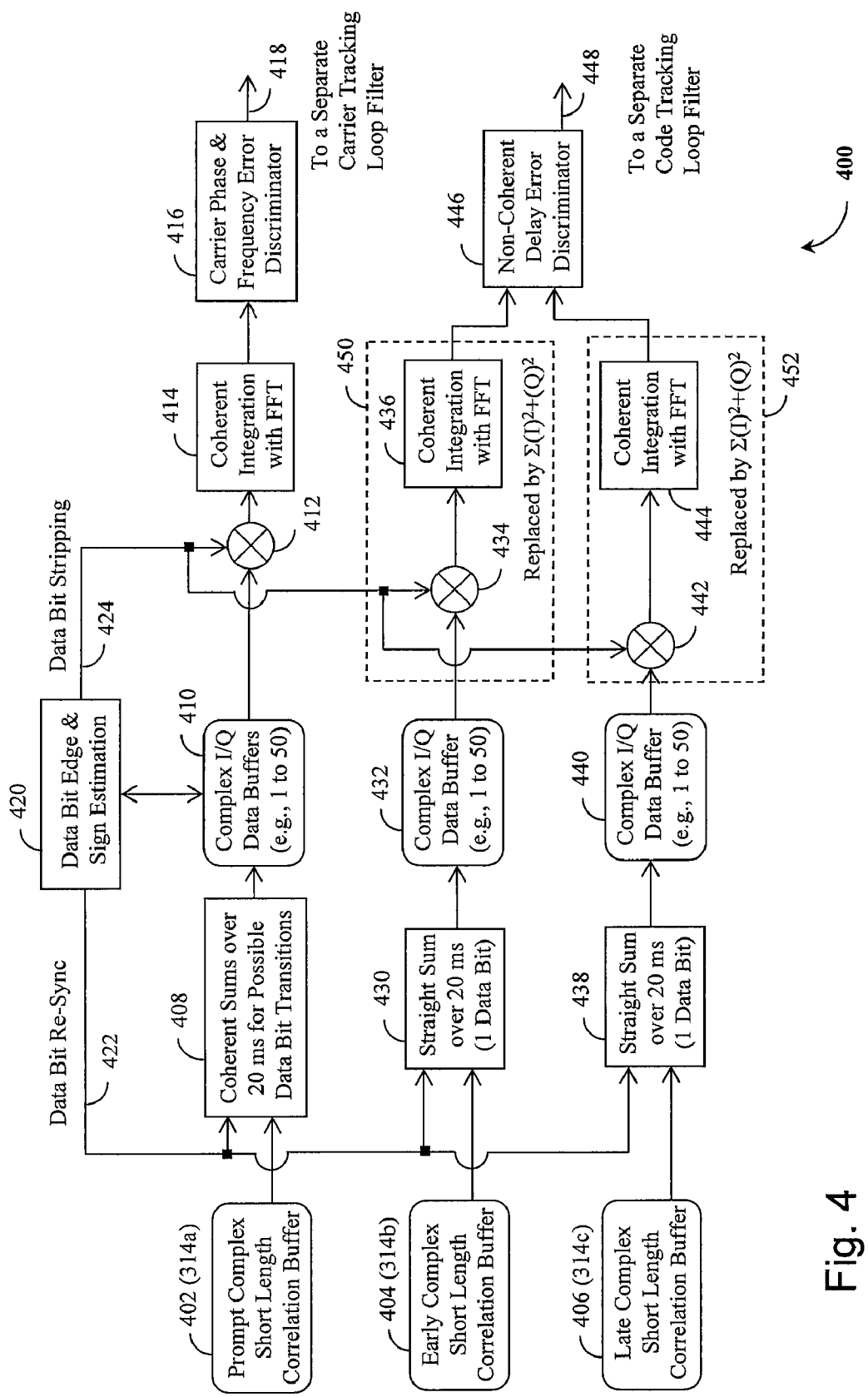
FIG. 4 is a schematic illustrating an exemplary code and carrier error discriminator with bit edge and sign estimation via a block integrating Fourier transform within a weak signal tracking channel in accordance with an embodiment of the present invention.

Referring to FIG. 4, an exemplary code and carrier error discriminator 400 is shown with data bit edge and sign estimation via a block integrating Fourier transform (FFT/DFT). This code and carrier error discriminator was previously shown in FIG. 3 as a building block 316 and particularly suited for a weak signal tracking channel using separate code and carrier tracking loops. As shown, the prompt complex short-length correlations 314a stored in the prompt correlation buffer 402 are processed differently from the early and late complex short length correlations 314b and 314c stored in the early and later correlation buffers 404 and 406, respectively. Both the early and late correlations 404 and 406 are processed to feed a non-coherent delay error discriminator 446 with its output 448 to drive a separate code tracking loop filter whereas the prompt correlation 402 is processed to feed a carrier phase and frequency error discriminator 416 with its output 418 to drive a separate carrier tracking loop filter. The short-length correlations of the early and late correlators 404 and 406, typically 1 millisecond long, are added up over 20 milliseconds (i.e., one data bit long) and such straight sums 430 and 438 are accumulated up to, say, 50 data bits (i.e., 1 second long) in complex I/Q data buffers 432 and 440, respectively. The starting point of straight sums 430 and 438 is determined by the indicator for data bit re-sync 422 so as to align up with a data bit transition per sum. The sign of a data bit for each sum is stripped off at multipliers 434 and 442 with an estimate of the data bit 424 obtained from data bit edge and sign estimation 420. Data-stripped sequences are coherently integrated with FFT 436 and 444, respectively, for the early and late correlations and the results are fed to a non-coherent delay error discriminator 446. In an alternative embodiment wherein the residual Doppler frequency is small, the processing steps of data bit stripping 434 (and 442) and coherent integration with FFT 436 (and 444) can be replaced by power combination of separate additions of in-phase and quadrature-phase components 450 (and 452). This can save computation with minimal SNR loss.

However, the prompt short-length correlations 402 are processed in a much more elaborated way so as to enable data bit edge and sign estimation 420. As shown in FIG. 4, instead of calculating straight sums aligned to an estimated data bit transition as in blocks 430 and 438 for early and late correlations, respectively, a number of sums 408 are produced, each aligned with a candidate location for data bit transition around the estimated location, wherein successive short-length corrections are reversed in sign before being coherently added with FFT. Details of this operation are described in conjunction of FIG. 8 later in this specification. The prompt correlation sums over one data bit are accumulated up to, say, 50 data bits in the complex I/Q data buffers 410. These sums are used for data bit edge and sign estimation 420. The particular sequence of 20 millisecond sums that corresponds to the detected data bit transition is selected for data bit stripping 424 in a multiplier 412. The data-stripped sequence of 20 millisecond sums is further coherently integrated with FFT 414 to feed the carrier phase and frequency error discriminator 416. Given the complex correlations (I's and Q's) coherently integrated over a long period of time, the techniques for design and construction of the carrier phase and frequency error discriminator as well as delay error discriminator that possess the characteristics relevant to the present invention are well known to those of ordinary skill in the art.

There are two major difficulties in correlation over a long period of time and such a long correlation interval is necessary to boost the signal strength for weak signal tracking. One difficulty is that the tolerable frequency error between the incoming signal and the locally generated carrier replica is inversely proportional to the coherent integration interval, which must be met to keep the processing loss within an acceptable level. For example, the tolerable residual frequency error is 250 Hz for a 1 millisecond correlation but it is 25 Hz for a coherent integration of 20 milliseconds and only 2 Hz for an extended coherent integration of 256 milliseconds. In the following description, second-order effects will be omitted for simplicity and, consequently, the unknown signal frequency is assumed to be constant over a working interval.

Figure 5:
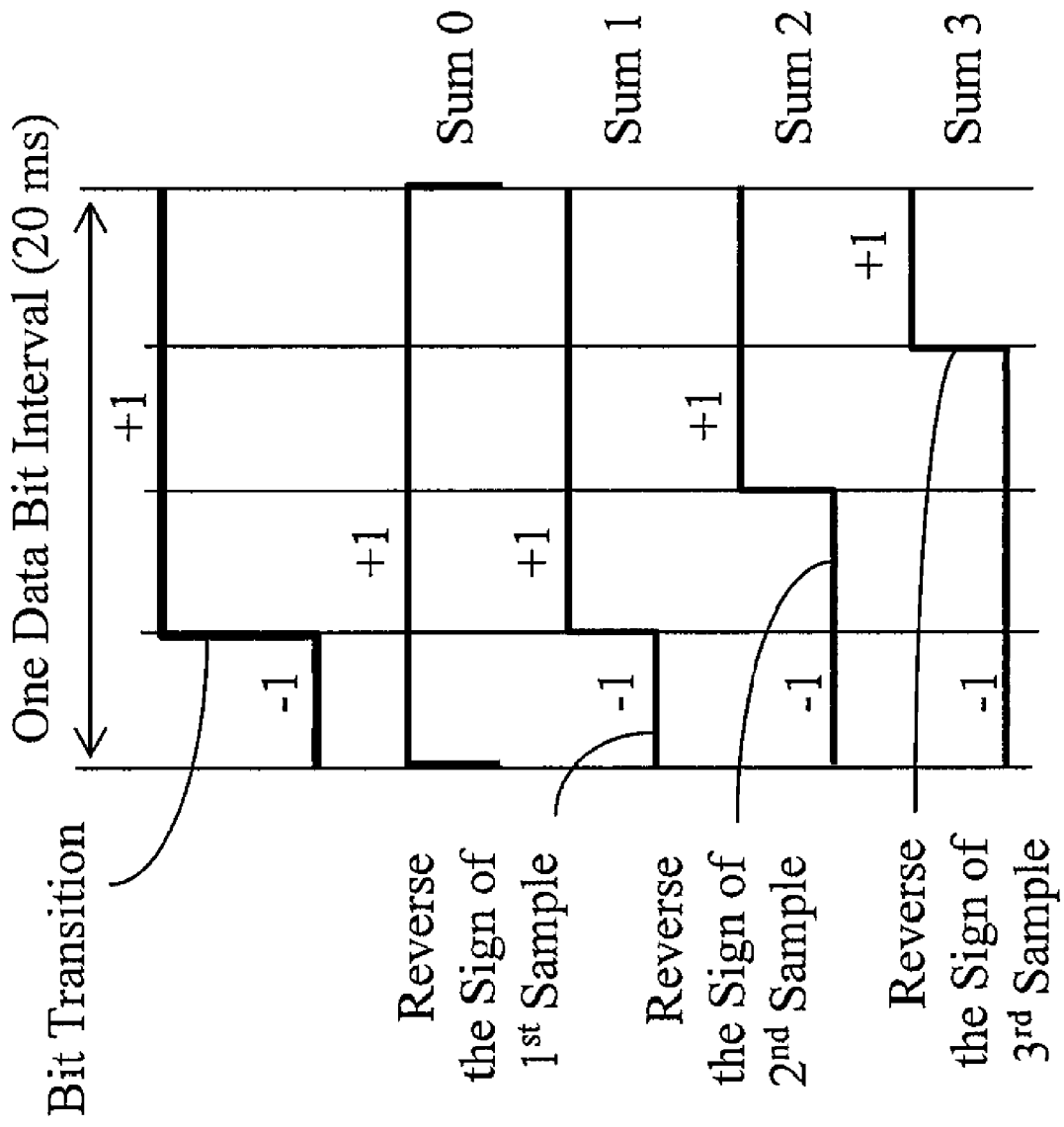
FIG. 5 is a graphic representation of a technique that successively reverses the sign of a sample point in the running sums to detect data bit transition in accordance with an embodiment of the present invention.

The other difficulty encountered in correlation over a long period of time is the change of the sign of data bits in the midst of a correlation interval. Data bit sign change is also equivalently referred to as data bit transition or data bit sign reversal in this specification. Prior to data bit synchronization, correlation can be destroyed even with perfect code phase alignment if the data bit reverses its sign in the middle of an integration interval. A preferred technique is illustrated in FIG. 5, which is adapted from the co-pending patent application Ser. No. 11/173,894 for weak signal acquisition aforementioned to the weak signal tracking case of the present invention. With this technique, twenty sums of twenty 1 millisecond correlations are maintained, where each sum successively reverses the sign of one 1 ms correlation of the previous sum. The matched reversal rectifies all 1 millisecond correlations to the same sign, thus allowing constructive summation to yield the maximum value for the sum. As shown in FIG. 5, this technique allows for the determination of a data bit transition, if any, within one data bit alone.

Figures 6A, 6B:
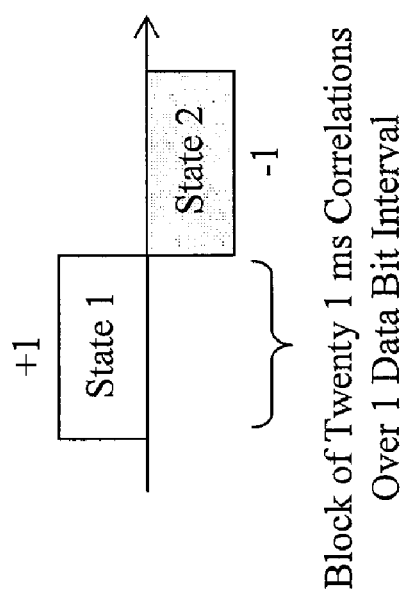
FIGS. 6a and 6b are graphic representations of data bit transition states for an aligned block in terms of a time diagram (FIG. 6a) and a truth table (FIG. 6b), respectively, in accordance with an embodiment of the present invention.

When it is desired to coherently integrate beyond one data bit of 20 milliseconds, the possible change of sign between two successive data bits has to be accounted for and each of the twenty sums experiences a different bit transition pattern. For simplicity, twenty 1 millisecond correlations will be reffered to hereafter as a block of 1 millisecond correlations, which is over a 1 data bit interval of 20 milliseconds. When the tentative bit edge is assumed to be at the very first data point of the block, there are only two sign possibilities, either positive or negative, for such an aligned block, as shown in FIG. 6a for a time diagram and in FIG. 6b for a truth table.

However, for those blocks whose tentative bit transition is assumed to be at one of the remaining 19 data points within the block, the bit patterns for two successive blocks are more complicated and have four possibilities for such unaligned blocks. As shown in the time diagram of FIG. 7a, the first two correspond to no bit transition while the other two represent one transition. The four states are defined as (1) State 1: all positive; (2) State 2: all negative; (3) State 3: transition from negative to positive; and (4) State 4: transition from positive to negative. According to this definition and the truth table shown in FIG. 7b, it is easy to verify that State 1 and State 3 share the same transition pattern for the subsequent block; so do State 2 and State 4. Furthermore, State 2 is the mirror image of State 1 (i.e., of the same pattern except for a sign difference); and State 4 is the mirror image of State 3. Therefore, only a two-state machine, rather than a four-state machine, can be used to represent bit transitions, thus saving a half of the memory and computation. The sign ambiguity associated with the two-state machine is of no consequence so long as the sign is assigned consistently throughout the extended interval.

Figure 8:
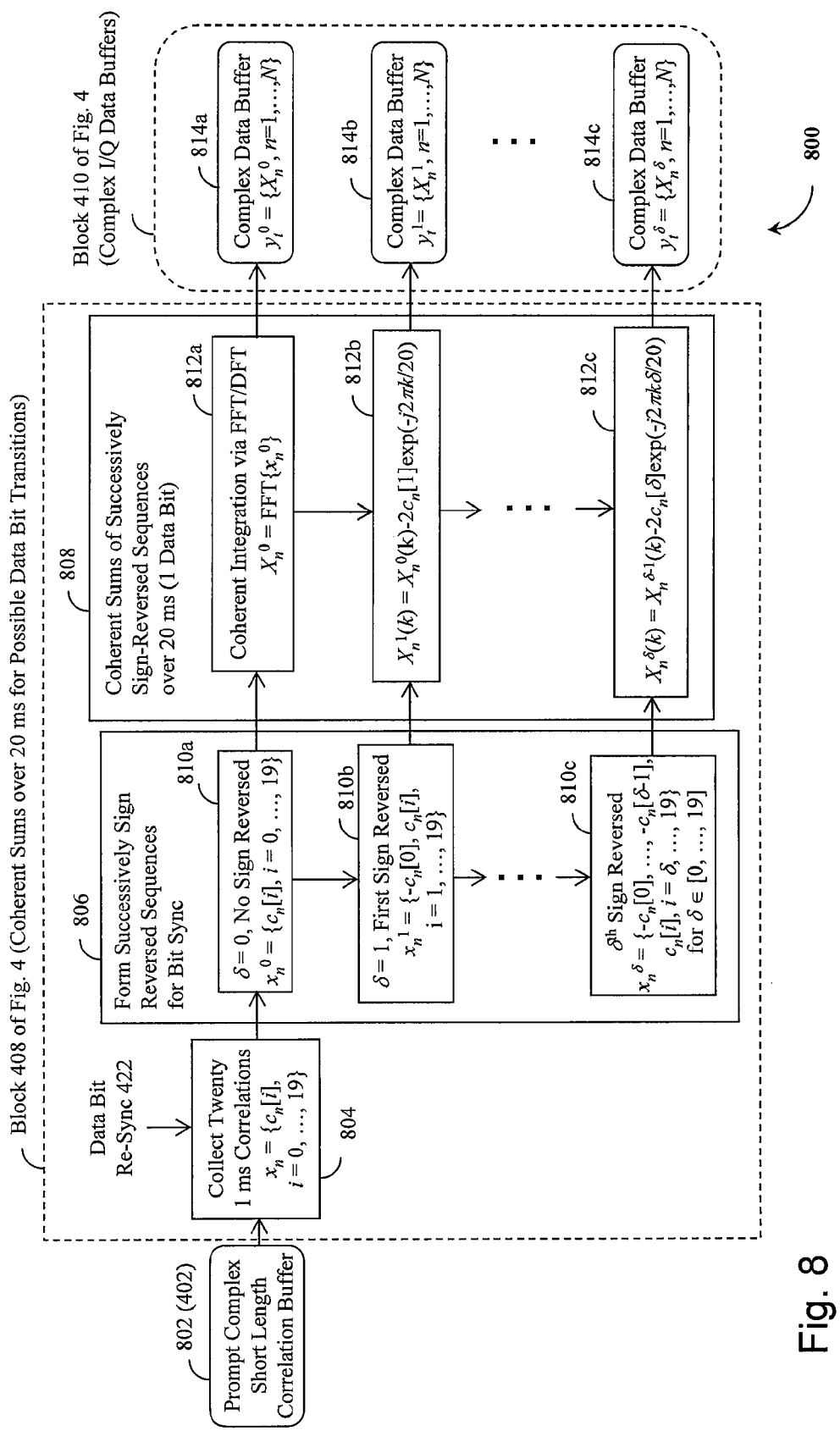
FIG. 8 is a schematic illustrating an exemplary method for coherent summation over one data bit for possible data bit transitions in accordance with an embodiment of the present invention.

Referring to FIG. 8, an exemplary method for coherent summation over one data bit (i.e., 20 milliseconds) is shown for the tracking mode in accordance with an embodiment of the present invention. Each sample in the prompt complex short-length correlation buffer 802 (The same as block 402 of FIG. 4) is denoted by $c_i$, where the subscript i is a time index of short-length correlations within an interval of a data bit length (a bit long). Aligned with the estimated data bit edge 422, which is initially provided by the acquisition mode and improved on by subsequent estimation 420, one first step is to collect a block of twenty correlations arranged into an array denoted by $x_n = \{c_n[i], i=0, 1, \ldots, 19\}$ 804, where the subscript n is a time index of data bits, resulting in a total index of $20(n-1)+i$ within the full interval. The next step is to form twenty successive sign-reversed sequences for bit sync 896. Let $\delta$ indicate the sample up to which all previous samples are sign-reversed. Three sequences 819 a, 810 b, and 810 c are shown in FIG. 8, wherein the more general sign-reversed sequence 810 c at $\delta \in \{0, 1, \ldots, 19\}$ is formed by $$x_n^\delta = \{-c_n[0], \ldots -c_n[\delta-1], c_n[i], i=\delta, \ldots 19\} \quad (1)$$

Clearly, $x_n^{\delta=0} = x_n$ is the original sequence without sign reversed as in block 810 a.

$$x_n^\delta = \{-c_n[0], \ldots, -c_n[\delta-1], c_n[i], i=\delta, \ldots 19\} \quad (1)$$

Clearly, $x_n^{\delta=0} = x_n$ is the original sequence without sign reserved as in block 810a.

Still referring to FIG. 8, coherent sums of successively sign-reversed sequence over 20 milliseconds (one data bit) 808 are obtained next. Although an initial frequency estimate is provided by the acquisition mode, it may not be accurate enough to close the tracking loops. To speed up the convergence, a refined brief search may be applied. A "brute force" approach would walk through a small frequency uncertainty interval around the initial frequency estimate, one step at a time. At each frequency step, the consecutive 1 millisecond complex correlations would be phase-rotated to the desired baseband, followed by adding up twenty phase-rotated short-length correlations every 20 milliseconds, thus reducing the correlations over a data bit into one data point. However, twenty sums would be needed per frequency step, each corresponding to a possible location of data bit transition within the 20 millisecond interval. This requires a considerable amount of computation for a tracking mode.

Instead of stepping through the frequency uncertainty interval, the Fourier transform (either DFT or FFT) can be used as a bank of bandpass filters, effectively performing the desired phase rotation to remove the residual Doppler. Although there can be up to twenty sums corresponding to all possible bit transitions, only a few are required around the initial data bit edge estimated from the acquisition mode. At first glance, it might seem necessary to calculate the time-consuming DFT or FFT for all selected sums. However, in accordance with an embodiment of the present invention as illustrated in FIG. 5, when the bit transition is processed by successively reversing the sign of one sample at a time over a data bit, the FFT/DFT of a new bit transition sequence can be constructed from its predecessor with few multiplication and additions, thus making it computationally viable. Denote the DFT of the sequence $x_n^\delta$ by $X_n^\delta = DFT\{x_n^\delta\} = \{X_n^\delta[k], k \in [0, 1, \ldots, 20N-1]\}$ where $$X_n^\delta[k] = \sum_{i=0}^{19} x_n^\delta[i] \exp\left\{\frac{-j2\pi[20(n-1)+i]}{20N}\right\}, \quad (2)$$

$$\delta \in [0, \ldots, 19]; k \in [0, \ldots, 20N-1]$$

where N is the number of data bits to be included in the extended coherent integration (with which the signal has been detected in the acquisition mode) and is also the number of frequency bins to test. It is important to note that the time index in the exponent of the complex exponential, namely, $20(n-1)+i$, starts its counting from the beginning of the extended coherent integration interval with N data bits. Zero-padding before and after the $n^{th}$ data bit is implied so as to maintain the timing relationship among all the samples, thus enabling coherent addition in the extended interval.

Then the DFT of the sequence $x_n^{\delta+1}$ can be derived from that of the sequence $x_n^\delta$ by $$X_n^{\delta+1}[k] = X_n^\delta[k] - 2x_n[\delta]\exp\left\{\frac{-j2\pi[20(n-1)+\delta]}{20N}\right\}, \quad (3)$$

$$\delta \in [0, \ldots, 19]; k \in [0, \ldots, 20N-1]$$

Since the first term on the right hand side of Eq. (3) has been evaluated for the previous bit transition, it can be stored in memory for re-use. As a result, simple multiplication and addition are sufficient to obtain the FFT/DFT for other sequences in the bit alignment search. It is important to note that in the tracking mode only a few $\delta$'s and $k$'s need to be evaluated. The coherent sums of successively sign-reversed sequences 808 can be understood as a 20 to 1 data compression from 1 kHz to 50 Hz, that is, from twenty 1 millisecond correlations into one complex value per data bit (every 20 milliseconds). The compressed data are stored in complex data buffers 814a, 814b, and 814c (also called the complex I/Q data buffers 410 in FIG. 4) for all tentative bit alignments denoted by $y_n^\delta = \{X_n^\delta[k], n=1, \ldots, N\}$ where N is the number of data bits held in buffers.

In this preferred embodiment, the technique of block-accumulating coherent integration over extended interval (BA-CIX), disclosed in the co-pending patent application Ser. No. 11/173,894 for weak signal acquisition, is applied to block 808 as described above to account for residual Doppler frequency. It is particularly efficient for cases where either residual Doppler frequency errors are significant or a stringent requirement is imposed on Doppler frequency estimation.

In an alternative embodiment wherein the residual Doppler frequency is ignored or is very small once the steady state is entered, the coherent sum 808 can be obtained with a DFT/FFT over 20 milliseconds (i.e., N=1) instead of 20N milliseconds (N>1). As an illustration, three coherent integrations 812a, 812b, and 812c are shown in FIG. 8 for data bit transition at $0^{th}$, $1^{st}$, and $\delta^{th}$ sample, respectively, for N=1.

Yet in another embodiment, the coherent sum 808 can be replaced by a simple averaging operation defined by $$X_n^\delta = \sum_{i=0}^{19} x_n^\delta[i], n=1, \ldots, N \quad (4)$$

This is similar to a low-pass filter with its first null bandwidth at 50 Hz, which can tolerate frequency errors up to 25 Hz with acceptable processing loss. It has been used for early and late straight sums over one data bit as in blocks 430 and 438 of FIG. 4, respectively.

Figure 9:
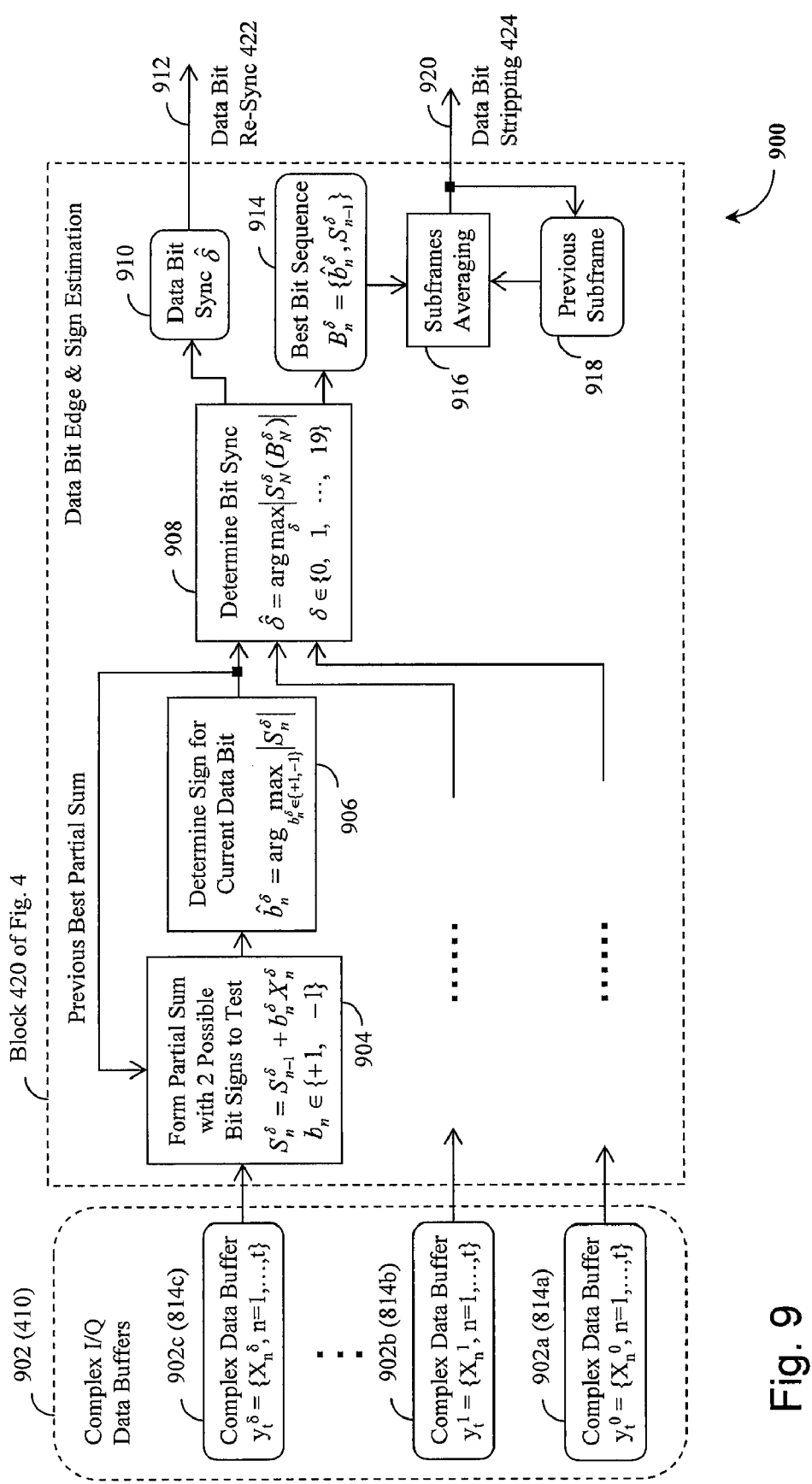
FIG. 9 is a schematic illustrating an exemplary method for data bit edge and sign estimation in accordance with an embodiment of the present invention.

FIG. 9 shows an exemplary method for estimation of data bit edge and sign from the 20 millisecond-integrated complex data samples in accordance with an embodiment of the present invention. The 20 millisecond-integrated complex data samples are stored in complex data buffers 902, one for each candidate data bit transition. For simplicity, only three complex data buffers 902a, 902b, and 902c are shown in FIG. 9 for the data bit transition at the $0^{th}$, $1^{st}$, and $\delta^{th}$ data sample, respectively. According to the patterns of data bit sign change modeled in FIGS. 5 and 6, there are two possible signs from one block to the next. To coherently add up successive blocks of data, the unknown data bit edge and sign are determined jointly as those that maximize the partial sum up to the latest block, each for a candidate data bit transition. To do so, one first step is to form a partial sum with two possible signs to test 904 as $$S_n^\delta = S_{n-1}^\delta + b_n^\delta X_n^\delta, n=1, \ldots, N; b_n \in \{+1, -1\} \quad (5)$$

The next step is to determine the sign for the current data bit 906 that maximizes the partial sum as $$\hat{b}_n^\delta = \arg\max_{b_n^\delta \in \{+1,-1\}} |S_n^\delta| = \arg\max_{b_n^\delta \in \{+1,-1\}} |S_{n-1}^\delta + b_n^\delta X_n^\delta|, \quad (6)$$

$$n = 1, \ldots, N$$

A bit sequence is formed for this alignment by joining the current best sign with the corresponding partial bit sequence as $B_n^\delta = \{\hat{b}_n^\delta, B_{n-1}^\delta\}$. It then follows to obtain data bits sync by determining the most likely bit edge 908 that maximizes the partial sums among all possible bit edges tested at the end of the current integration interval, i.e., when n=N, as $$\hat{\delta} = \arg\max_\delta |S_N^\delta(B_N^\delta)|, \delta \in \{0, 1, \ldots, 19\} \quad (7)$$

The estimated data bit edge 910 is used for data bit re-sync 912 in the subsequent extended integration intervals. The best bit sequence 914 is then obtained as $B_n^{\hat{\delta}}$. The data bit sign is determined per 20 milliseconds worth of data, although the partial sum is generated over the entire coherent integration interval. This may not be sufficient to guarantee a lower bit error rate (BER). As shown in FIG. 9, subframes averaging 916 is used to reduce the BER by adding the current best bit sequence 910 onto bits of the previous subframe 918 in a recursive manner. This is based on the fact that each subframe of 6 seconds long (300 bits) repeats itself every 30 seconds (1500 bits). Except for the last two subframes (referred to as Subframe No. 4 and 5), the first three subframes (Subframe No. 1, 2, and 3) have exactly the same contents within 4 hours. Under normal signal conditions, only the latest copy of the navigation message data is kept. Instead of overwriting the old navigation data bits, the averaging of the samples of the same data content over time can lead to an increase in SNR for weak signals. The improved bit sequence is then used for data bit stripping 920.

Figure 10:
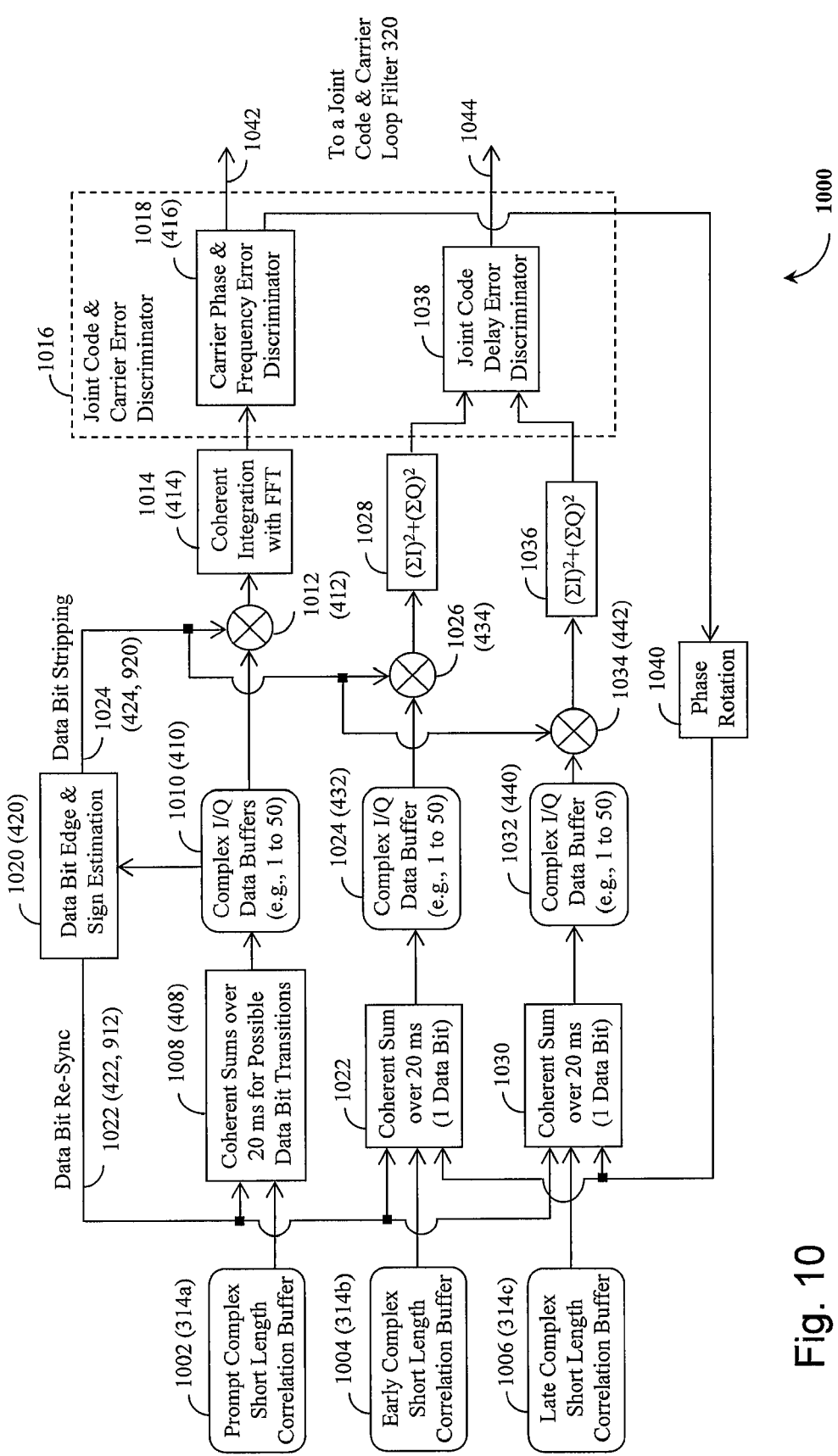
FIG. 10 is a schematic illustrating an alternative embodiment of a joint code and carrier error discriminator with bit edge and sign estimation via a block integrating Fourier transform within a weak signal tracking channel in accordance with the present invention.

Referring to FIG. 10, an alternative embodiment of a joint code and carrier error discriminator is shown in accordance with an embodiment of the present invention. In comparison to the embodiment of separate code and carrier error discriminators illustrated in FIG. 4, the operations on the prompt correlations are similar to those in FIG. 4. This includes obtaining coherent sums over 20 milliseconds for possible data bit transitions 1008 of prompt complex short-length correlations 1002 and performing data bit edge and sign estimation 1020 from complex I/Q data 1010. The estimated bit edge is sued for data bit re-sync 1022 while the estimated data bit sign is used for data bit stripping 1024 at the multiplier 1012. Coherent integration with FFT 1014 is applied to data-stripped data sequence with the output fed to a carrier phase and frequency error discriminator 1018.

However, coherent sums 1022 and 1030 of early and late complex short-length correlations 1004 and 1006 are used instead of straight sums 430 and 438 for early and late correlations, respectively. The coherent summation is achieved using phase rotation 1040 with estimated Doppler frequency from the prompt correlation in a carrier phase and frequency error discriminator 1018. This implies that the operations on the prompt correlations precede those on the early and late correlations. Because of this coupling, it produces a joint code delay error discriminator 1038. Since coherent sums 1022 and 1030 are performed via phase rotation 1040 up front, coherent integrations 436 and 444 are replaced with straight sums of complex I/Q data 1024 and 1032, followed by data bit stripping at multipliers 1026 and 1034 and power-taking 1028 and 1036 for the early and late correlations, respectively, to drive the joint code delay error discriminator 1038. The output 1042 of a carrier phase and frequency error discriminator 1018 and the output 1044 of a joint code delay error discriminator 1038 are sent together to a joint code and carrier loop filter 320.

In conventional GPS receivers, a delay-locked loop (DLL) makes use of a delay error discriminator for code tracking while a phase-locked loop (PLL) makes use of a phase error discriminator for carrier tracking. Sometimes, the carrier-tracking loop uses a frequency-locked loop (FLL) with a frequency error discriminator instead. In these conventional GPS receivers, the code and carrier tracking loops are typically designed separately and run "independently," although there may be some assistance (e.g., rate aiding) from the carrier loop to the code loop. In conventional designs, each tracking loop is represented by a small signal model, thus linear and time-invariant. Classical control theory is applied to select the most appropriate loop filter parameters such as loop order and bandwidth. When the loop order is small (i.e., a $1^{st}$ or $2^{nd}$ order), the closed loop system is unconditionally stable. However, to reduce steady-state errors for high dynamic signals, the loop order may be raised higher than the $3^{rd}$ order. Then the stability becomes a design issue. Conventional loop filter designs use fixed-coefficients and the resulting performance is at best a compromise between the noise performance and the dynamic tracking capability. Although adaptive loop filters with variable bandwidth have been proposed in the past, their implementation and tuning are quite complicated. Rate aiding from an external sensor such as an inertial measurement unit (IMU) has been used for tightly coupled GPS/IMU implementation.

In contrast, the joint error discriminator of the preferred embodiment acts as a measurement prediction error when a Kalman filter is used as the joint code and carrier tracking loop filter 318. With a Kalman filter, the signal dynamics and particularly the coupling between the code and carrier loops can be advantageously modeled into the filter. This concept of joint code and carrier tracking has been tested with real GPS data. The details of the approach and the processing results are disclosed in the paper entitled "GPS Signal Tracking with Kalman Filter Based on Joint Code Delay and Carrier Phase and Frequency Error Discriminator," presented by the first co-inventor at the $60^{th}$ Annual Meeting of the Institute of Navigation in June 2004 in Dayton, Ohio, which is hereby incorporated into this specification by reference. In addition, the use of a multiple model estimator, with each model representing a different bandwidth, is disclosed in the same paper as an efficient way to adjust the tracking loop bandwidth adaptively, which is therefore also incorporated into this specification by reference.

Although the above description contains much specificity, it should not be construed as limiting the scope of the invention but as merely providing illustrations of some of the presently preferred embodiments of this invention. For example, the present invention provides a generic signal processing architecture of versatility wherein many processing blocks can be tailored to achieve a desired combination of functionalities.

Reference has been made mostly to the GPS signals with C/A-codes but the techniques of the present invention are equally applicable to the Russian GLONASS and European GALILEO signals, ground and space-based augmentation signals, pseudolite signals, and other components of the GNSS in general. Similarly, the techniques of the present invention are disclosed in connection with correlator-based GPS receivers but it can work equally well with matched filter-based receivers. If the matched filters are used to operate on the full C/A-code epoch of 1 millisecond, the receiver architecture is similar to that of the correlator-based receiver disclosed above. However, techniques of the present invention can be used in different receiver architectures. Although the present invention system and method are devised for weak signals, it can be applied to normal signals as is without changes.

The invention can be implemented in digital electronic circuitry, or in computer hardware, firmware, software, or in combinations thereof. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files, such devices include magnetic disks, such as internal hard disks and removal disks, magnetic-optical disks, and optical disks. Storage devices suitable for tangibly embodying computer program instructions and data include all forms of non-volatile memory, including by way of example, semiconductor memory devices such as EPROM, EEPROM, and flash memory devices, magnetic disks such as internal hard disks and removable disks, magnetic-optical disks, and CD-ROM disks and rewritable disks. Any of the foregoing can be supplemented by, or incorporated in, ASICs.

It is understood that the figures and associated description above illustrate only the preferred embodiments of the present invention system and method. A person skilled in the art can therefore make numerous alterations and modifications to the described embodiments utilizing functionally equivalent components and method steps to those shown and described. All such modifications are intended to be included within the scope of the present invention as defined by the appended claims.

What is claimed is:

1. In a navigational system utilizing a plurality of satellites that transmit radio-frequency signals containing time and orbit information of said satellites, wherein said radio-frequency signals are severely attenuated when received at a receiver, a method of obtaining a position solution of the receiver from a received attenuated radio-frequency signal comprising:

strengthening said received attenuated radio-frequency signal, wherein strengthening said received attenuated radio-frequency signal comprises coherently integrating, over an extended interval of time, correlations between said received attenuated radio-frequency signal and locally generated signal replicas to produce extended-interval correlations, the extended-interval correlations produced based on dynamically estimated data bit edges and data bit signs;

maintaining lock onto said received attenuated radio-frequency signal, wherein maintaining lock comprises performing error discrimination based on said extended-interval correlations; and obtaining a position solution of the receiver based on time, frequency, and data bits extracted from said received attenuated radio-frequency signal.

2. The method according to claim 1, wherein coherently integrating, over an extended interval of time, correlations between said received attenuated radio-frequency signal and locally generated signal replicas to produce extended-interval correlations comprises obtaining short-length correlations between said received attenuated radio-frequency signal and said locally generated signal replicas.

3. The method according to claim 2, wherein obtaining short-length correlations between said received attenuated radio-frequency signal and said locally generated signal replica comprises:

preparing at least one complex signal carrier replica at a carrier frequency;

preparing at least three signal code replicas at early, prompt, and late spacings;

mixing samples of said received attenuated radio-frequency signals with said at least one complex signal carrier replica to produce a down-converted received signal; and correlating said down-converted received signal with said signal code replicas to produce short-length correlations, the short-length correlations comprising early short-length correlations, prompt short-length correlations, and late short-length correlations.

4. The method according to claim 3, wherein preparing at least one complex signal carrier replica comprises:

obtaining a carrier frequency command from a carrier tracking loop filter;

obtaining an initial frequency offset from an acquisition mode;

adding said carrier frequency command, said initial frequency offset, and a nominal frequency to produce a total carrier frequency; and driving a carrier numerically controlled oscillator at said total carrier frequency to produce a carrier phase for said complex signal carrier replica.

5. The method according to claim 4, further comprising:

obtaining a rate aiding from an external source when available; and adding said carrier frequency command, said initial frequency offset, said rate aiding and a nominal frequency to produce said total carrier frequency.

6. The method according to claim 4, wherein the step of obtaining the carrier frequency command from the carrier tracking loop filter further includes adjusting said frequency command a number of times within an extended update interval by a term proportional to an estimated rate of change in frequency.

7. The method according to claim 6, wherein the step of adjusting said frequency command further includes user of an external aiding for estimating rate of change in frequency when available.

8. The method according to claim 2, wherein preparing at least three signal code replicas at early, prompt, and late spacing comprises:

obtaining a chipping rate command from a code tracking loop filter;

obtaining a rate scaling from a carrier tracking loop;

adding said chipping rate command, said rate scaling, and a nominal chipping rate to produce a total chipping rate;

driving a code numerically controlled oscillator at said total chipping rate to produce a code phase;

setting a code generator with an initial code phase from an acquisition mode; and driving said code generator with said code phase to produce at least three signal code replicas at early, prompt, and late spacings.

9. The method according to claim 3, wherein:

performing error discrimination based on said extended-interval correlations comprises running code and carrier error discriminators with said extended-interval correlations; and maintaining lock onto said received attenuated radio-frequency signal further comprises updating a carrier tracking loop with an output from said carrier error discriminator and updating a code tracking loop with an output from said code error discriminator to maintain lock onto said received attenuated radio-frequency signal in closed tracking loops.

10. The method according to claim 9, wherein:

said extended-interval correlations comprises prompt extended-interval correlations;

running a carrier error discriminator with said extended-interval correlations comprises running said carrier error discriminator with said prompt extended-interval correlations;

coherently integrating, over an extended interval of time, correlations between said received attenuated radio-frequency signal and locally generated signal replicas to produce extended-interval correlations comprises:

deriving said prompt extended-interval correlations based on said prompt short-length correlations.

11. The method according to claim 10, wherein deriving said prompt extended-interval correlations based on said prompt short-length correlations comprises:

deriving, based on said prompt short-length correlations, a sequence of prompt complex correlation samples and a sequence of estimated data bits for the extended interval of time;

multiplying said sequence of prompt complex correlation samples with said sequence of estimated data bits for the extended interval of time to strip data bits from said sequence of prompt complex correlation samples, producing a data bits stripped sequence of prompt complex correlation samples;

applying a Fourier transform to said data bits stripped sequence of prompt complex correlation samples to produce a plurality of prompt extended-interval correlations, each prompt extended-interval correlation associated with a different frequency bin.

12. The method according to claim 11, wherein deriving, based on said prompt short-length correlations, a sequence of prompt complex correlation samples and a sequence of estimated data bits for the extended interval of time comprises:

collecting, over a bit-long interval of time, said prompt short-length correlations into a bit-long collection of prompt short-length correlations;

obtaining an estimated data bit edge;

forming a plurality of bit-long sequences based on said bit-long collection of prompt short-length correlations, each bit-long sequence corresponding to a possible data bit edge around said estimated data bit edge;

coherently integrating, over a bit-long interval of time, said plurality of bit-long sequences to produce a plurality of coherently integrated bit-long correlations, each coherently integrated bit-long correlation corresponding to a bit-long sequence;

accumulating said plurality of coherently integrated bit-long correlations in a plurality of complex data buffers for an extended-interval of time; and extracting, from said plurality of complex data buffers, said sequence of prompt complex correlation samples.

13. The method according to claim 12, wherein forming a plurality of bit-long sequences based on said bit-long collection of prompt short-length correlations, each bit-long sequence corresponding to a possible data bit edge around said estimated data bit edge, comprises:

determining a number of sequences necessary to cover uncertainty in said estimated data bit edge; and reversing the sign of said short-length correlations successively to produce said plurality of bit-long sequences.

14. The method according to claim 12, wherein coherently integrating, over a bit-long interval of time, said plurality of bit-long sequences to produce a plurality of coherently integrated bit-long correlations, when frequency error is small, comprises:

summing the prompt short-length correlations in each of said plurality of bit-long sequences.

15. The method according to claim 12, wherein coherently integrating, over a bit-long interval of time, said plurality of bit-long sequences to produce a plurality of coherently integrated bit-long correlations, when frequency error is large, comprises:

applying Fourier transform to said plurality of bit-long sequences.

16. The method according to claim 12, wherein coherently integrating, over a bit-long interval of time, said plurality of bit-long sequences to produce a plurality of coherently integrated bit-long correlations comprises, when in transition from an acquisition mode to a tracking mode with a large frequency error, includes:

padding zeros in front of and behind said bit-long collection of prompt short-length correlations a preset extended length; and applying Fourier transform to said plurality of bit-long sequences, the Fourier transform taken only at selected frequency bins when a discrete Fourier transform is used.

17. The method according to claim 15, wherein the step of padding zeros in front of and behind said bit-long collection of prompt short-length correlations to a preset extended length is done in such a manner that the relative timing of the prompt short-length correlations in the bit-long collection of prompt short-length correlations is preserved over said preset extended length.

18. The method according to claim 16, wherein applying Fourier transform to said plurality of bit-long sequences comprises:

applying a Fourier transform to a first sequence of said plurality of bit-long sequences:
and based on the Fourier transform of the first sequence of said plurality of bit-long sequences, constructing a Fourier transform for subsequence sequences of said plurality of bit-long sequences.

19. The method according to claim 12, wherein deriving, based on said prompt short length correlations, a sequence of prompt complex correlation samples and a sequence of estimated data bits for the extended interval of time comprises:

obtaining a best data bit sequence for a current extended interval of time;

obtaining corresponding data bits of a previous subframe; and averaging said best data bit sequence for the current extended interval of time with said corresponding data bits of the previous subframe to produce the sequence of estimated data bits for the extended interval of time.

20. The method according to claim 19, wherein obtaining a best data bit sequence for a current extended interval of time comprises:

collecting, over said extended interval of time, sequences of said coherently integrated bit-long correlations, each sequence corresponding to a possible data bit edge;

for each sequence of coherently integrated bit-long correlations, forming partial sums with two possible signs to test and determining a best sign based on a maximum partial sum; and deriving, based on the best sign for each sequence of coherently integrated bit-long correlations, said best data bit sequence.

21. The method according to claim 19, wherein obtaining an estimated data bit edge comprises:

obtaining partial sums of coherently integrated bit-long correlations, each corresponding to a possible data bit edge and each corrected with said best data bit sequence for the current extended interval of time; and choosing a data bit edge that produces a maximum partial sum as said estimated data bit edge.

22. The method according to claim 20, wherein said step of forming partial sums is performed for each frequency bin when said coherently integrated bit-long correlations are calculated using Fourier transform.

23. The method according to claim 10, wherein running said carrier error discriminator with said prompt extended-interval correlations comprises:

choosing a frequency bin at which a prompt extended-interval correlation reaches a maximum magnitude as a carrier frequency and a phase of the prompt extended-interval correlation that reaches the maximum magnitude as a carrier phase error; and
updating the carrier tracking loop with the carrier frequency and the carrier phase error.

24. The method according to claim 9, wherein:
said extended-interval correlations comprises early and late extended-interval correlations;
running a code error discriminator with said extended-interval correlations comprises running said code error discriminator with said early and late extended-interval correlations;
coherently integrating, over an extended interval of time, correlations between said received attenuated radio-frequency signal and locally generated signal replicas to produce extended-interval correlations comprises:
   deriving said early and late extended-interval correlations based on said early and late short-length correlations.

25. The method according to claim 24, wherein:
deriving said early and late extended-interval correlations when frequency error is large comprises:
   obtaining a sequence of early complex correlation samples over the extended-interval time, each sample a result of summing early short-length correlations over a bit;
   obtaining a sequence of late complex correlation samples over the extended-interval time, each sample a result of summing late short-length correlations over a bit;
   obtaining a sequence of estimated data bits over the extended-interval time;
   multiplying said sequence of early complex correlation samples with said sequence of estimated data bits to strip data bits from said sequence of early complex correlation samples, producing a data bits stripped sequence of early complex correlation samples;
   multiplying said sequence of late complex correlation samples with said sequence of estimated data bits to strip data bits from said sequence of late complex correlation samples, producing a data bits stripped sequence of late complex correlation samples; and
   applying Fourier transform to said data bits stripped sequence of early complex correlation samples and said data bits stripped sequence of late complex correlation samples to produce a plurality of early and late extended-interval correlations, each early and late extended-interval correlation associated with a different frequency bin;
running said code error discriminator with said early and late extended-interval correlations comprises:
   obtaining maximum early and late values of said plurality of early and late extended-interval correlations; and
   calculating a delay error from said maximum early and late values, the delay error used to update the code tracking loop.

26. The method according to claim 24, wherein:
deriving said early and late extended-interval correlations when frequency error is small comprises:
   obtaining a sequence of early complex correlation samples over the extended-interval time, each sample a result of summing early short-length correlations over a bit;
   obtaining a sequence of late complex correlation samples over the extended-interval time, each sample a result of summing late shod-length correlations over a bit;
   squaring the early complex correlation samples in said sequence of early complex correlation samples, producing a data bits stripped sequence of early complex correlation samples;
   squaring the early complex correlation samples in said sequence of late complex correlation samples, producing a data bits stripped sequence of late complex correlation samples;
   performing power-combination of said data bits stripped sequence of early complex correlation samples and said data bits stripped sequence of late complex correlation samples to produce a plurality of early and late extended-interval correlations;
running said code error discriminator with said early and late extended-interval correlations comprises:
   obtaining maximum early and late values of said plurality of early and late extended-interval correlations; and
   calculating a delay error from said maximum early and late values, the delay error used to update the code tracking loop.

27. The method according to claim 9, wherein:
said extended-interval correlations comprises prompt, early and late extended-interval correlations;
coherently integrating, over an extended interval of time, correlations between said received attenuated radio-frequency signal and locally generated signal replicas to produce extended-interval correlations comprises:
   deriving said prompt extended-interval correlations basal on said prompt correlations by performing the steps of:
      deriving, based on said prompt shod-length correlations, a sequence of prompt complex correlation samples and a sequence of estimated data bits for the extended interval of time;
      multiplying said sequence of prompt complex correlation samples with said sequence of estimated data bits for the extended interval of time to strip data bits from said sequence of prompt complex correlation samples, producing a data bits stripped sequence of prompt complex correlation samples;
      applying a Fourier transform to said data bits stripped sequence of prompt complex correlation samples to produce a plurality of prompt extended-interval correlations, each prompt extended-interval correlation associated with a different frequency bin;
   deriving said early and late extended-interval correlations based on said early and late shod-length correlations by performing the steps of:
      obtaining a sequence of early complex correlation samples over the extended-interval time, each sample a result of summing early shod-length correlations over a bit;
      obtaining a sequence of late complex correlation samples over the extended-interval time, each sample a result of summing late short-length correlations over a bit;
      obtaining a sequence of estimated data bits over the extended-interval time;
      multiplying said sequence of early complex correlation samples with said sequence of estimated data bits to strip data bits from said sequence of early complex correlation samples, producing a data bits stripped sequence of early complex correlation samples;
      multiplying said sequence of late complex correlation samples with said sequence of estimated data bits to strip data bits from said sequence of late complex correlation samples, producing a data bits stripped sequence of late complex correlation samples; and applying Fourier transform to said data bits stripped sequence of early complex correlation samples and said data bits stripped sequence of late complex correlation samples to produce a plurality of early and late extended-interval correlations, each early and late extended-interval correlation associated with a different frequency bin;

running a carrier error discriminator with said extended-interval correlations comprises running said carrier error discriminator with said prompt extended-interval correlations by performing the steps of:

choosing a frequency bin at which a prompt extended-interval correlation reaches a maximum magnitude as a carrier frequency and a phase of the prompt extended-interval correlation that reaches the maximum magnitude as a carrier phase error; and updating the carrier tracking loop with the carrier frequency and the carrier phase error;

running a code error discriminator with said extended-interval correlations comprises running said code error discriminator with said early and late extended-interval correlations by performing the steps of:

obtaining maximum early and late values of said plurality of early and late extended-interval correlations; and calculating a delay error from said maximum early and late values, the delay error used to update the code tracking loop.

28. A receiver including:

an antenna capable of coupling to signals transmitted from a plurality of satellites of the Global Navigation Satellite System;

a radio frequency front-end that receives said signals from said plurality of satellites via said antenna, said radio frequency front-end comprising at least a bandpass filter, a power amplifier, and a frequency down-converter;

a baseband signal processor comprising signal acquisition and tracking circuitry containing a plurality of functionally identical channels for extracting navigation data bits and other time and frequency parameters from said signals using said functionally identical channels; and a data processor for calculating a navigation solution from said extracted navigation data bits and other time and frequency parameters;

wherein:

the baseband signal processor dynamically assigns said signals to the functionally identical channels; and wherein each of the functionally identical channel performs weak signal wacking by using a block-accumulating coherent integrator that coherent adds successive blocks of consecutive short-length correlations over a desired extended length with data bit transition and data bit sign dynamically estimated.

29. The receiver according to claim 28, wherein each of said functionally identical channels includes:

a signal acquisition processor; and a signal tracking processor that determines navigation data bits embedded in said satellite signal and extracts code time and carrier frequency parameters.

30. The receiver according to 29, wherein said signal tracking processor includes:

a baseband converter for converting intermediate frequency signal samples to baseband signal samples using a reference carrier;

at least three complex despread correlators for stripping off spectrum-spreading codes from said baseband signal samples and producing said consecutive short-length correlations;

said block-accumulating coherent integrator, the block-accumulating coherent integrator comprising a data bit edge and data bit sign estimator that dynamically estimates, based on said consecutive short-length correlations, data bit edges and data bit signs;

code phase and carrier phase and frequency error discriminators that estimate, based on at least one output from said block-accumulating coherent integrator, differences between baseband signal samples and locally generated code and carrier replicas;

code and carrier tracking loop filters that use at least one output from said code phase and carrier phase and frequency error discriminators for code chipping and carrier frequency commands; and a carrier replica generator and at least three code replica generators, the carrier replica generator producing said carrier replica at said carrier frequency commands from said carrier tracking loop filter and the code replica generators producing said code replicas at said code chipping commands from said code tracking loop filter.

* * * * *

UNITED STATES PATENT AND TRADEMARK OFFICE
CERTIFICATE OF CORRECTION

PATENT NO.         : 7,639,181 B2                                          Page 1 of 1
APPLICATION NO.    : 11/618131
DATED              : December 29, 2009
INVENTOR(S)        : Chun Yang et al.

It is certified that error appears in the above-identified patent and that said Letters Patent is hereby corrected as shown below:

On the Title Page of Patent, Item (75) Inventors delete "Chun Wang" and insert
-- Chun Yang -- therefor.

Signed and Sealed this
Fifth Day of November, 2013

Teresa Stanek Rea
*Deputy Director of the United States Patent and Trademark Office*